June 3, 1952  J. FRYE  2,598,900

HEAT SEALING DEVICE

Filed Nov. 24, 1947

INVENTOR.
Jack Frye

BY
Donald F. McCarthy
ATTORNEY

Patented June 3, 1952

2,598,900

UNITED STATES PATENT OFFICE 2,598,900

HEAT SEALING DEVICE

Jack Frye, Sedona, Ariz.

Application November 24, 1947, Serial No. 787,803

3 Claims. (Cl. 219—21)

This invention relates to heat sealing devices, and more particularly to simple household or office devices for bonding two or more layers of sheet or similar material by fusion of a thermoplastic material.

Thermoplastic materials of various types, in sheet form, have been widely adopted for wrapping, packaging and protective covering purposes. Such thermoplastic materials as regenerated cellulose, rubber hydrochloride, plasticized polyvinyl chloride, vinyl chloride-vinylidine chloride interpolymers and the like, in sheet form, are widely used in homes, offices, workshops, studios and the like, for the above-noted and similar purposes. In addition to materials of the type exemplified above, such flexible sheet materials as paper or cloth, either coated or impregnated with thermoplastic material, or provided with a bonding layer or strip of such heat-sealable material, applied as a coating at its marginal edges or as a separate strip or layer inserted between the surfaces to be bonded are used extensively for the purposes illustrated above. The thermoplastic or other heat-sealable materials mentioned above find their most common applications in bags for food storage, particularly in deep-freeze units, refrigerators and ice boxes, in garment bags for the protective storage of clothing and other textile materials, particularly woolens, and in protective covers for books, photographs, notebooks and the like.

The use of thermoplastic or other heat-sealable materials exemplified above, for wrapping, covering or packaging purposes frequently involves effecting a union or bond between two or more layers of the thermoplastic material. Thus, in wrapping food for freezing or storing purposes, the food is commonly placed in a bag made of thermoplastic sheet material and the open end of the bag is sealed by placing together and heating the edge portions surrounding the opening. Usually, such seal takes the form of a continuous fused joint or seam which should be gastight and moistureproof. This type of closure is primarily intended to prevent odors originating with the food contained in the bag from escaping into the storage space and contaminating other materials located therein, as well as to preserve the quality of the food stored in the bag by preventing contamination of the bag contents. With garment bags, to refer to another typical example, the edges surrounding the opening through which the garments or other textile materials have been introduced into the bag, are to be sealed primarily in order to prevent moths or dust from entering the bag and attacking or soiling the articles placed therein. While a continuous seam or bond of the type referred to above with reference to food storage bags may be employed also in this instance, a more intermittent type of closure may be considered sufficient for this purpose and in this case, the edges of the material surrounding the opening may be merely tacked at spaced intervals to effect a union of the bonding portions which will satisfy the requirements.

The prior art has proposed a number of devices for sealing thermoplastic wrapping and similar sheet materials, but all the devices heretofore developed were designed for industrial rather than home or office uses and therefore, took the form of bulky and costly equipment. In view of the comparatively limited and intermittent use of devices of this type for household, office and similar purposes, the size, price and space demands of the commercial equipment did not justify its use for other than commercial purposes. Accordingly, the housewife heretofore has been restricted to using an ordinary pressing iron whenever it was necessary or desirable to heat-seal thermoplastic wrapping and similar sheet materials.

It is one of the primary objects of the present invention to fill this gap in the prior art, and to provide heat sealing tools for thermoplastic materials in sheet form, such as food storage or garment bags or the like, which are distinguished by simplicity, low cost and facile operability and which, therefore, are marketable as household utensils or office devices with all the characteristics of simplicity, low price and small space consumption required of articles of this kind.

It is a further object of the invention to provide sealing equipment for thermoplastic sheet and similar materials which are effective in making uniform and homogenous seams, both of the airtight and moistureproof variety and of a more intermittent, tacking type, the equipment being particularly designed for facilitating intermittent employment for home and office applications, as distinguished from continuous operation on an industrial or commercial scale.

A still further object of the invention is to provide heat sealing equipment for thermoplastic material which may be operated by a housewife or an unskilled operator without danger of injury from contact with electrically energized or moving parts of the operating mechanism.

In the drawings affixed to this specification and forming part thereof, several embodiments of the invention are illustrated diagrammatically by way of example, but I wish it to be understood that I do not desire to be limited to the details of construction, design and operation shown and described as numerous modifications falling within the scope of the appended claims may occur to persons skilled in the art and could be used without departing from the spirit of the invention or sacrificing any advantages derived.

In the drawings,

Fig. 4 is a section taken along line 4—4, of the head shown in Fig. 3; while

Figure 1:
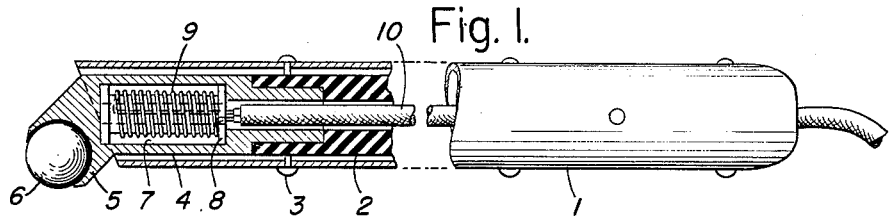
Fig. 1 is a side view, partly in section, of one embodiment of the invention.

Referring first to Fig. 1 of the drawings, this illustrates a ball pen type of sealing utensil comprising a holder 1 and an insert 2 held in position in the holder by means of screws 3, this insert being made of insulating material and serving to thermally and electrically insulate the handle from electrical and thermal components of the system. Secured to the insulating insert 2 and mounted in the end of holder 1 is another insert 4 made of heat-conductive material which projects beyond the end of holder portion 1 and terminates in a ball supporting portion 5 which is set at an angle with respect to the main portion of insert 4 for a purpose to be described. The ball support portion 5 serves as a bearing for a ball 6 made of heat-conductive material which is arranged to be freely movable in, but not removable from, the ball support portion 5. A hollow space 7 in the interior of the insert portion 4 accommodates an electrical heating element comprising an insulating base 8 and an electrical resistance wire coil 9 to which electrical current is passed by a cord 10 which extends through the holder and, through a switch (not shown in the drawing), to an ordinary electrical outlet for home use.

In the operation of the simple ball pen type of sealing tool according to Fig. 1, the electrical heating coil 9 is energized by current supplied through cord 10 and effectively heats the heat-conductive insert portion 4 which, through ball support portion 5, conveys the heat to the heat-conductive ball 6. The sealing tool is passed over the thermoplastic material to be sealed, the offset ball support portion 5 rendering it possible to hold the tool at a convenient angle while passing the same over the material to be sealed. By a proper choice of heat characteristics which, if desired, may be regulated by a variable thermostat, a perfectly uniform and homogenous seam may be obtained, the freely moving ball of heat-conductive material not only facilitating the passage across the material but also minimizing friction which frequently would cause the thin plastic sheet to be torn or otherwise distorted.

Figure 2:
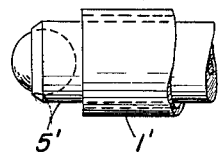
Fig. 2 is a side view of a modified detail of the embodiment of the invention shown in Fig. 1.

Referring now to Fig. 2, this device corresponds in most respects to the device shown in Fig. 1, except that the ball supporting portion 5' is aligned with the axis of the holder 1', instead of being set at an angle as in Fig. 1. This is but a simplification of the device of Fig. 1 and involves a corresponding reduction in manufacturing costs.

Figure 3:
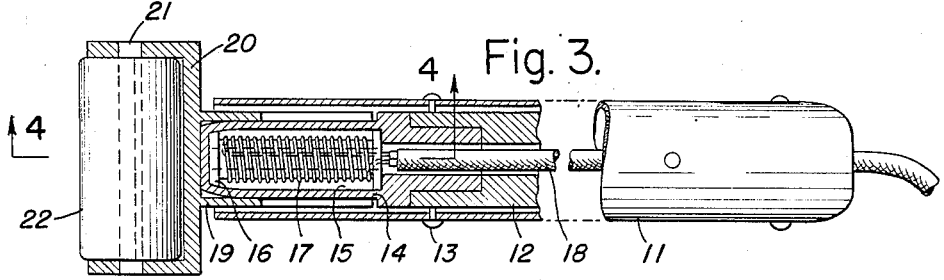
Fig. 3 is a side view, partly in section, of another modification of the invention, involving a holder and a detachable head therefor.
Figure 4:
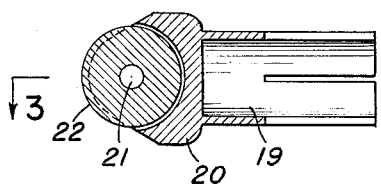

Referring now to Figs. 3 and 4, these illustrate a sealing tool designed for permitting a number of different heads to be used on one and the same holder. The holder 11 encloses an insulating insert 12 secured in the holder by means of screws 13. Likewise permanently inserted in the holder is a heating element supporting insert 14 made of heat-conductive material which in a hollow space 15 provided in its interior, accommodates the insulating base 16 and the electrical resistance wire coil 17 of the heating element. Current is passed to the heating element by means of cord 18, a switch (not shown in the drawing) and an ordinary outlet of electrical current for home use. The heating element supporting insert 14, over the greater part of its length, is spaced from the holder portion 11 to accommodate, for sliding placement therein, the sleeve 19 of one of the detachable heads which, in the embodiment shown in Figs. 3 and 4, comprises a housing portion 20 and journaled therein, a shaft 21 mounting a rotary roller 22.

In the operation of the device according to Figs. 3 and 4, after the proper head has been selected and inserted into the holder by sliding sleeve 19 into the space between the holder 11 and the heating element supporting portion 14, current is passed to the electrical resistance heating coil 17 which is heated and from which the heat is conveyed, through the heat-conductive support portion 14, and the similarly heat-conductive portions 19, 20, and 21, to the rotary roller 22 which may be passed over the thermoplastic material to be bonded in a manner similar to that described with reference to Fig. 1.

While only one head incorporating a somewhat elongated rotary roller has been shown in Figs. 3 and 4, it is obvious that heads involving numerous other shapes and heating surfaces may be employed for use in connection with the holder 11. Thus, for example, the ball supporting member 5 shown in Fig. 1 could be equipped with a sleeve similar to sleeve 19 so that a head incorporating a ball similar to ball 6 could be detachably employed in connection with holder 11. Other heads which could be used in connection with holder 11 may involve short or elongated, rectangular shapes, points, and shapes of any other desired configuration which might be called for by a specific application.

Figure 5:
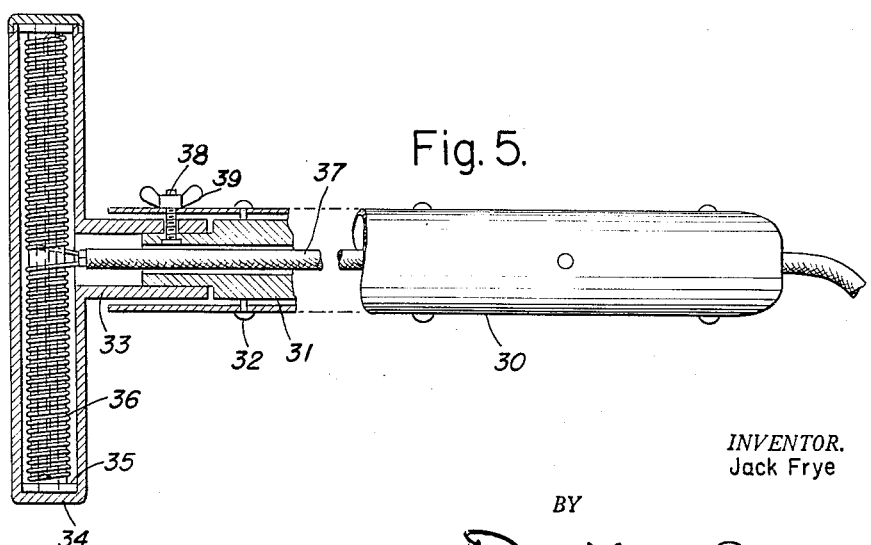
Fig. 5 illustrates a side view, partly in section, of a third embodiment of the invention.

Referring now to Fig. 5, a holder 30 accommodates an insulating insert 31 held in position by screws 32 in a manner similar to that described with reference to Figs. 1 and 3. The end of holder 30 is slotted to permit the pivotal motion (out of the plane of the paper in the showing of Fig. 5), of a sleeve 33 which pivots on a bolt 38 having a wing nut 39 which, when tightened, is designed to hold the sleeve in position at an angle to the holder portion 30. Mounted on the sleeve 33 is a rectangular head comprising a housing 34. Enclosed in the interior of housing 34 there is arranged the insulating base 35 mounting the electrical resistance heating coil 36 of an electrical heating element. Current is supplied to the heating element through the cord 37 and a switch (not shown in the drawing), from an ordinary electrical outlet for home use (not shown).

In the operation of the device of Fig. 5, the head and holder portions are angularly adjusted with respect to each other by means of a proper setting of the wing screw 34, whereupon the heating element is energized and the head is passed over the thermoplastic portions to be sealed, in a manner similar to that described with reference to the preceding figures.

Variable thermostats and other auxiliary devices may be used in connection with all the embodiments of the invention shown or contemplated, particularly where it is desired to treat a variety of materials which might call for different heating temperatures for the most effective bonding operation.

The simplicity of manufacture and operation, the low cost and small space consumption, and the elimination of any danger to the unskilled operator impart advantages to the sealing tools of the invention which enhance their utility for home and office uses as well as any other applications where the use of industrial machinery is prohibited by excessive cost, unwarranted space consumption and unnecessarily complex operation.

I claim:

1. A heat sealing tool for thermoplastic sheet material, comprising in combination, a holder, a head mounted on said holder and movable relative thereto, means for heating said head, and means through said holder for passing electrical current to said heating means, said head comprising a ball supporting member and a ball freely movable in said supporting member, said head being readily detachable from said holder whereby to enable a single holder to be equipped with a variety of heads.

2. A heat sealing tool for thermoplastic sheet material, comprising in combination, a holder, a head mounted on said holder and movable relative thereto, means for heating said head, an electrical conductor through said holder for passing current to said heating means, said head comprising a ball supporting member mounted in said holder at an angle to the longitudinal axis thereof, and a ball freely movable in said supporting member, said head being readily detachable from said holder whereby to enable a single holder to be equipped with a variety of heads.

3. A heat sealing tool for thermoplastic sheet material, comprising in combination, a holder, a head mounted on said holder and movable relative thereto, means for heating said head, and current conducting means through said holder for energizing said heating means, said head comprising a ball supporting member mounted in said holder in alignment with the longitudinal axis thereof, and a ball freely movable in said supporting member, said head being readily detachable from said holder whereby to enable a single holder to be equipped with a variety of heads.

JACK FRYE.

REFERENCES CITED

The following references are of record in the file of this patent:

UNITED STATES PATENTS

| Number | Name | Date |
|---|---|---|
| 1,455,842 | Kelly | May 22, 1923 |
| 1,656,256 | Wilson | Jan. 17, 1928 |
| 1,656,690 | Blackburn | Jan. 17, 1928 |
| 1,781,158 | Campbell | Nov. 11, 1930 |
| 1,997,805 | Stump | Apr. 16, 1935 |
| 2,074,629 | Ungar | Mar. 23, 1937 |
| 2,219,649 | Hayes et al. | Oct. 29, 1940 |
| 2,231,132 | Lovett | Feb. 11, 1941 |
| 2,372,737 | Phillips, Jr. | Apr. 3, 1945 |
| 2,401,820 | Fairley | June 11, 1946 |
| 2,430,920 | Dodge | Nov. 18, 1947 |
| 2,484,566 | Hiller | Oct. 11, 1949 |

FOREIGN PATENTS

| Number | Country | Date |
|---|---|---|
| 863,897 | France | Apr. 11, 1941 |